US007290997B2

(12) United States Patent
Hinzpeter et al.

(10) Patent No.: US 7,290,997 B2
(45) Date of Patent: Nov. 6, 2007

(54) PLANT FOR MANUFACTURING OF TABLETS

(75) Inventors: Jurgen Hinzpeter, Schwarzenbek (DE); Ingo Schmidt, Schwarzenbek (DE); Joachim Greve, Pogeez (DE); Mattias Meier, Schwarzenbek (DE); Klaus-Peter Preuss, Molln (DE)

(73) Assignee: Fette GmbH, Schwarzenbek (DE)

( * ) Notice: Subject to any disclaimer, the term of this patent is extended or adjusted under 35 U.S.C. 154(b) by 394 days.

(21) Appl. No.: 10/832,617

(22) Filed: Apr. 27, 2004

(65) Prior Publication Data

US 2004/0213868 A1 Oct. 28, 2004

(30) Foreign Application Priority Data

Apr. 28, 2003 (DE) ................................ 103 19 022

(51) Int. Cl.
*B29C 43/58* (2006.01)

(52) U.S. Cl. ...................... 425/136; 425/162; 425/345; 700/206; 700/249

(58) Field of Classification Search ........ 425/135–173, 425/78, 344–355; 700/206, 249; 361/683, 361/740
See application file for complete search history.

(56) References Cited

U.S. PATENT DOCUMENTS

| | | | | |
|---|---|---|---|---|
| 4,633,720 | A * | 1/1987 | Dybel et al. | 73/862.53 |
| 4,817,006 | A * | 3/1989 | Lewis | 700/206 |
| 5,322,655 | A * | 6/1994 | Ebey | 264/40.5 |
| 6,000,831 | A * | 12/1999 | Triplett | 425/143 |
| 6,047,579 | A * | 4/2000 | Schmitz | 72/15.1 |
| 6,122,565 | A * | 9/2000 | Wenning et al. | 700/206 |
| 6,282,082 | B1 * | 8/2001 | Armitage et al. | 361/681 |
| 6,370,021 | B1 * | 4/2002 | Hinzpeter et al. | 361/683 |
| 6,979,187 | B2 * | 12/2005 | Hinzpeter et al. | 425/135 |
| 7,014,443 | B2 * | 3/2006 | Hinzpeter et al. | 425/167 |

FOREIGN PATENT DOCUMENTS

| | | | |
|---|---|---|---|
| DE | 197 409 0002 | A1 | 8/1998 |
| DE | 199 18 298 | A1 | 11/2000 |
| DE | 199 46 441 | A1 | 4/2001 |

* cited by examiner

*Primary Examiner*—Yogendra N Gupta
*Assistant Examiner*—Thu Khanh T. Nguyen
(74) *Attorney, Agent, or Firm*—Vidas, Arrett & Steinkraus

(57) ABSTRACT

A plant for the manufacture of tablets, comprising a rotary tabletting machine, a control cabinet which houses a machine computer, a control desk which preferably is mobile and houses a service computer to operate functions of the tabletting machine and store data including an emergency stop, a printer connected to the control desk, and peripheral devices such as a tablet tester, dust trap, etc., wherein said control cabinet, control desk, and further peripheral devices have a power supply and are connected to said tabletting machine, wherein said control desk and said tabletting machine have a transceiver each and two wireless transmission links are provided between said transceivers out of which one is designed to transmit data and control signals and the other one is designed to transmit an emergency stop signal.

8 Claims, 2 Drawing Sheets

PLANT FOR MANUFACTURING OF TABLETS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The substantial portion of such a plant is the rotary tabletting machine which, via a control cabinet, not only is supplied with energy, but also receives control commands because the control cabinet houses a machine computer. Such a plant further includes a control desk in which a series of control parameters are stored which can be selectively invoked by an operator. Furthermore, the production and batch data are logged in the control desk. This is why the control desk is known to have a printer. A plant of this type further includes a so-called burr and dust removal device into which the tablets ejected from the tabletting machine are routed prior to being packed. Finally, it also includes a tester which is associated with the burr and dust removal device and from which tablets are withdrawn at predetermined intervals to undergo testing for their weight, height, compactness, etc.

The peripheral devices need a power supply, in turn. In the known case, they are connected, via cables, to the tabletting machine which has an appropriate terminal strip for power supply from the control cabinet. Hence, the primary power supply is via the control cabinet. However, it is also known to provide the peripheral devices with mains cables of their own. Moreover, the peripheral devices are connected to the tabletting machine via signal cables for the transfer of data and control signals to and from the machine and to the control cabinet. In addition, a separate link exists for the so-called emergency stop between the control desk and the tabletting machine and/or control cabinet. The operator has to be in a position to bring the plant to a stop straightaway by actuating a switch on the control desk.

Cables which are installed or suspended around the tabletting machine are undesirable specifically in pharmaceutical production rooms. Openly installed cables are considered difficult to clean. Besides, they constitute stumble hazards and obstruct the accessibility of the individual devices.

It is the object of the invention to provide a plant for the manufacture of tablets to the effect that this improves its accessibility and flexibility.

BRIEF SUMMARY OF THE INVENTION

In the inventive plant, the control desk and the tabletting machine each have a transceiver which form two wireless transmission links, one of them serving for the transfer of data and transmission of control signals and the other serving for the transmission of an emergency stop signal. Furthermore, the control desk has a power storage device which, according to an aspect of the invention, is a battery, fuel cell or other power system.

In the inventive plant, the control desk can completely make do with no cable connections. Therefore, it can be placed at choice at any place within a room and can be moved to any other location with no regard needing to be taken of cable connections. This increases the accessibility of the plant and improves the sanitary conditions.

According to an aspect of the invention, the printer is arranged separately from the control desk and, in turn, is provided with a transceiver to establish a third wireless data transfer and signal transmission link between the control desk and the printer. Thus, the printer can be positioned at any location inside or even outside the production room. The printer can also be provided with a power source of its own or can also be connected to the mains if it is arranged outside the production room.

Likewise, the other peripheral devices such as the dust removal device and tester can be equipped with a transceiver and can communicate with the tabletting machine via a no-contact or wireless link. Then, even these devices will preferably be provided with a power storage device of their own so as to give the plant an enhanced mobility and flexibility and exclude stumble hazards caused by cable connections. The only cable connection which is necessary for power supply as before is the one between the tabletting machine and the control cabinet. Therefore, the invention makes it possible to nearly randomly arrange the individual components of the plant for the manufacture of tablets in an adaptation to spatial requirements. The invention also decisively improves the sanitary conditions.

It is known to arrange the control desk on a mobile base via a stay and to make the stay telescopically adjustable to adapt it to the height desired by the operator. It is also possible to store the height of operation according to the operator's desire so that the respective operator will be able to adjust the control panel to his height by pressing a button. In an aspect of the invention, the base of the control desk accommodates the energy storage device, e.g. the battery, whereas two antennas are arranged in the desk region, preferably in the upper region, for the two wireless transmission links.

Preferably, the transmission links are radio links. They allow transmissions at a high data rate. However, other transmission links are also conceivable, e.g. via infrared light.

The invention will be described in more detail below with reference to an embodiment shown in the drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated FIG. 1 shows a plan view of a schematically illustrated plant of the invention.

Figure 1:
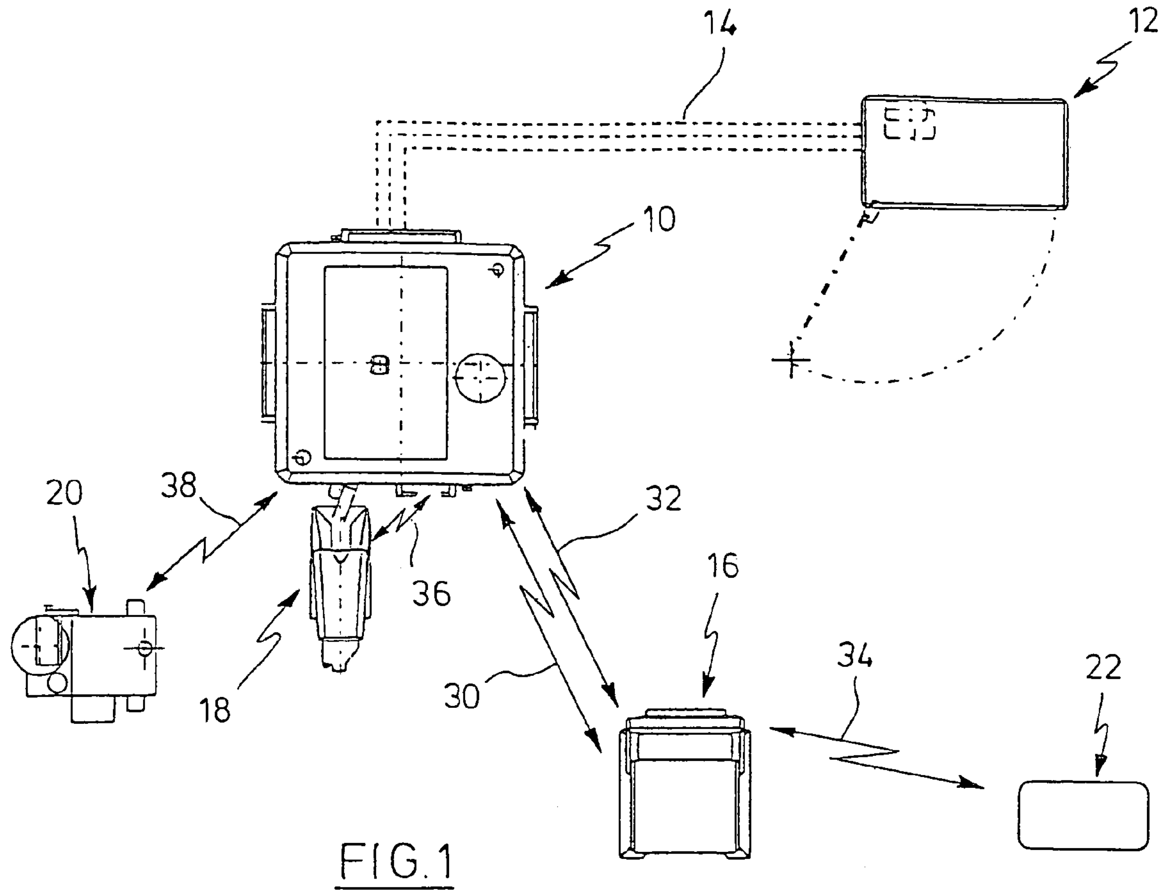
Figure 2:
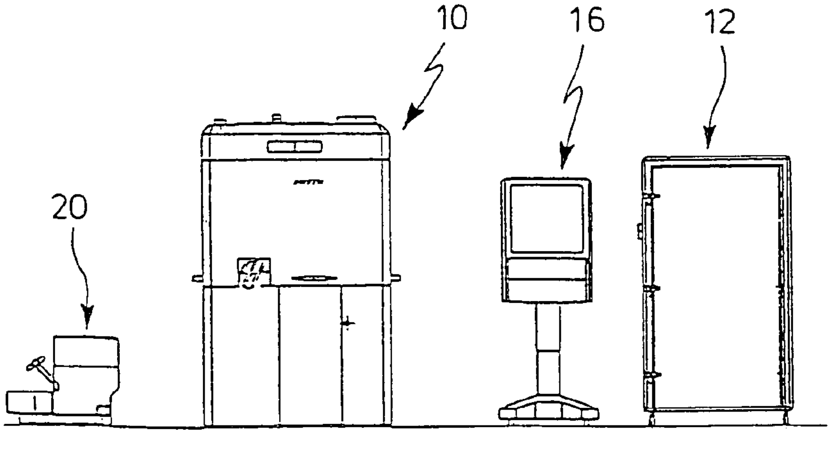
FIG. 2 shows a horizontal view of the plant of FIG. 1.

FIGS. 1 and 2 very schematically show a rotary tabletting machine 10 in an appropriate casing. Reference will not be made to details of the tabletting machine 10. A control cabinet 12 which is connected to the tabletting machine 10 via a cable connection 14 is provided as a separate component. The cable connection ensures the supply of power to the tabletting machine, on one hand. The power main consumption unit is the motor driving the rotor of the rotary press. In addition, the cable connection 14 includes several cables or even a single one for the transmission of data and control signals from the machine computer, which is housed in the control cabinet 12, to the tabletting machine, and which also controls the operation of the tabletting machine 10 with regard to the individual functions according to a specified program.

The plant further includes a control desk 16 which has a service computer, a control panel, and an emergency stop switch. The tabletting machine further has associated therewith a burr and dust removal device 18. The tablets ejected from the tabletting machine get into the device 18 where they are cleared of burr and dust before being packed. The device 18 has associated therewith a tester 20. Tablets are diverted to the tester 20 from time to time and are tested there for individual production parameters, e.g. thickness, compactness, weight, height, etc. Finally, a separate printer 22 is provided.

The control desk 16, burr and dust removal device 18, tester 20, and printer 22 each include an internal power supply in the form of a battery or the like. It is preferred to associate a charger with each of the components so that it is possible to charge the battery without removing it from the device. It is understood that a separate charger can also be provided in order to charge the batteries of the individual components.

Moreover, each of the components described includes a transceiver (not shown). The tabletting machine 10 also includes a transceiver. A plurality of wireless data and control signal transmission links are established in this manner. Two transmission links 30, 32 are set up between the control desk 16 and the tabletting machine 10. One helps transmit data and control signals bidirectionally as is also common in conventional plants via wire connections during a communication between the control desk and the tabletting machine. The second transmission link transmits the signals of an emergency stop switch (not shown) on the control desk 16. Actuating the emergency stop switch allows the operator to bring the plant to a stop immediately.

In FIG. 1, the printer 22 which is integrated in the control desk in known cases is disposed separately and, hence, can also be located in a room other than that of the tabletting machine. A further wireless transmission link 34 is set up between the printer 22 and the control desk 16. Finally, wireless transmission links 36, 38 are established between the tabletting machine and the burr and dust removal device 18, on one hand, and the tester 20, on the other. The transceivers preferably operate via a radio although other options are conceivable.

It can be appreciated that the components 16 through 22 can be arranged in the space at random and there are no annoying cable connections.

Figure 3:
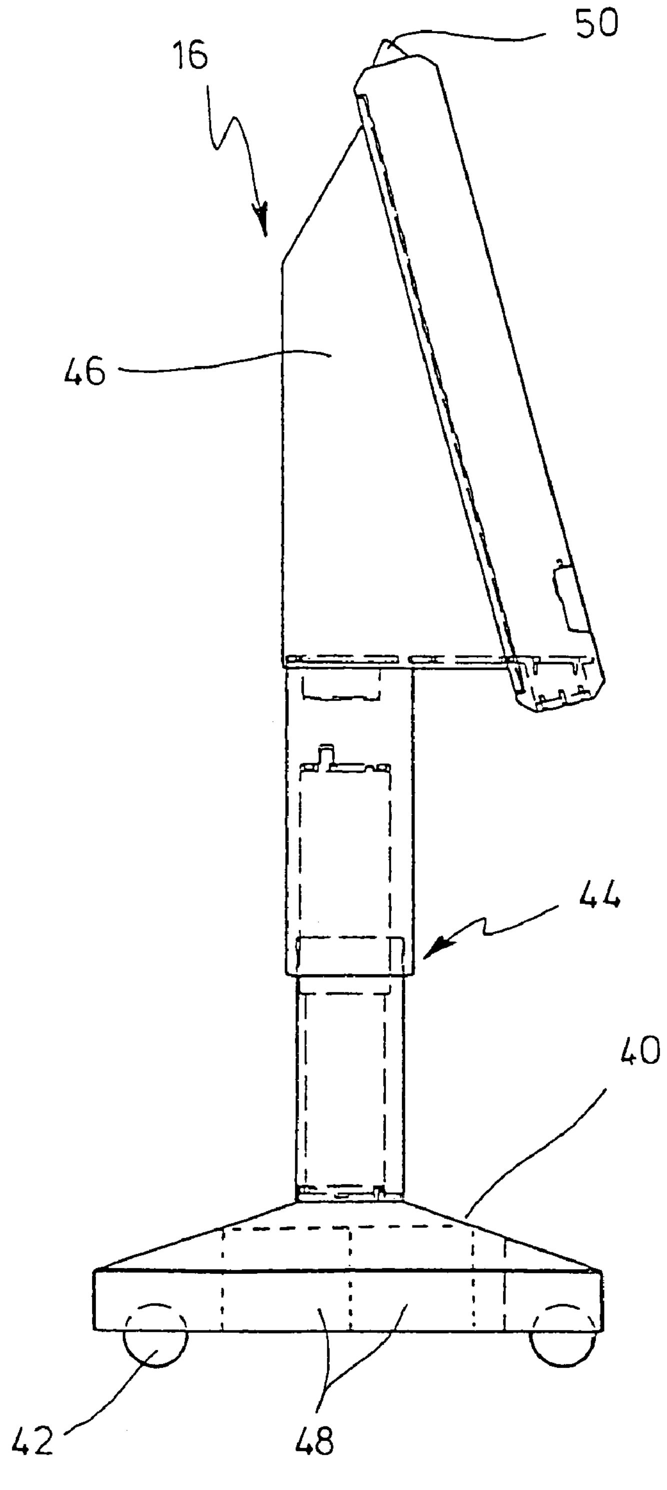
FIG. 3 shows a control desk of the plant of FIGS. 1 and 2 in a side view.

In FIG. 3, the control desk 16 is presented at a larger scale. It has a base 40 which rests on rollers 42 and supports a telescopic stay 44 which holds a desk 46 in which a service computer and a control panel are arranged. A drive, which is not shown in detail, helps shift the telescopic stay 44 in height, namely via the control panel. The desired height of the stay can also be moved to if the stay is stored for the respective height. In FIGS. 3 and 4, batteries which are housed in the base 40 for the power supply of the control desk 16 are outlined in phantom lines. Besides, an antenna protection envelope, which contains an antenna, can be seen at 50 in the upper region of the control panel. Two antennas need to be provided for the two wireless transmission links 30, 32 (FIG. 1).

The wireless transmission links 30, 34, 36, 38 cannot only communicate in the direction which is shown, but can also be formed by a radio network.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A plant for the manufacture of tablets, comprising a rotary tabletting machine, a control cabinet which houses a machine computer, a control desk which preferably is mobile and houses a service computer to operate functions of the tabletting machine and store data including an emergency stop, a printer connected to the control desk, and peripheral devices such as a tablet tester, dust removal device, etc., wherein the control cabinet, control desk, and further peripheral devices have a power supply and are connected to the tabletting machine via signal links, characterized in that said control desk (16) and said tabletting machine (10) have a transceiver each and two wireless transmission links (30, 32) are provided between said transceivers one of which is designed to transfer data and control signals and the other one is designed to transmit an emergency stop signal, and further wherein at least the control desk (16) has an internal power supply.

2. The plant according to claim 1, characterized in that said power source is a battery, fuel cell or other power source.

3. The plant according to claim 1, characterized in that said control desk (16) has a base (40), a stay (44), and a desk-like control panel (46) at the upper end of said stay and the power storage device (48) is disposed in the base (40).

4. The plant according to claim 3, characterized in that two antennas (50) are arranged in the upper region of said desk-like control panel (46).

5. The plant according to claim 1, characterized in that the printer (22) is arranged separately from said control desk (16) and, in turn, has a transceiver to establish a third wireless data and signal transmission link (34) between same and said transceiver in the control desk (16).

6. The plant according to claim 1, characterized in that at least one of said further peripheral devices (18, 20) has a transceiver to form a further signal transmission and data transfer link (36, 38) between same and said transceiver of the tabletting machine (10).

7. The plant according to claim 6, characterized in that at least one of said further peripheral devices (22, 18, 20) has a power storage device of its own.

8. A plant for the manufacture of tablets, comprising:

a rotary tabletting machine;

a control cabinet which houses a machine computer;

a control desk which houses a service computer to operate functions of the tabletting machine and store data including an emergency stop, the control desk having an internal power supply;

a printer connected to the control desk;

the control cabinet and control desk are connected to the tabletting machine via signal links, the control desk and the tabletting machine each having a transceiver, and two wireless transmission links are provided between the transceivers of said control desk and said tabletting machine, one wireless transmission link for transferring data and control signals and the other wireless transmission link for transmitting an emergency stop signal.

* * * * *